Nov. 16, 1926.
F. H. THOMPSON
TAG FASTENER
Filed July 25, 1924
1,607,319
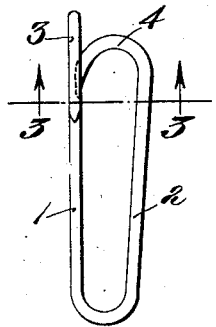
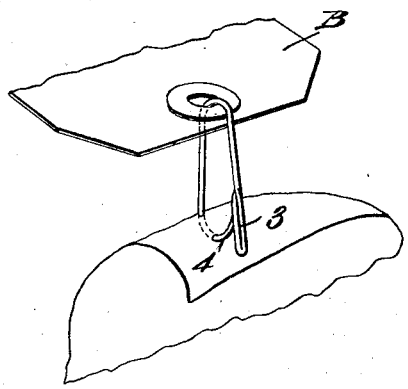
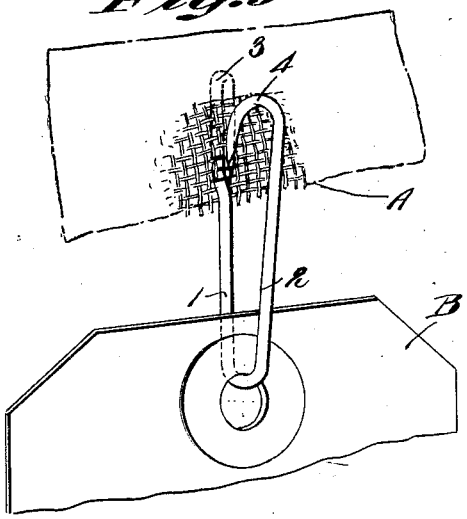
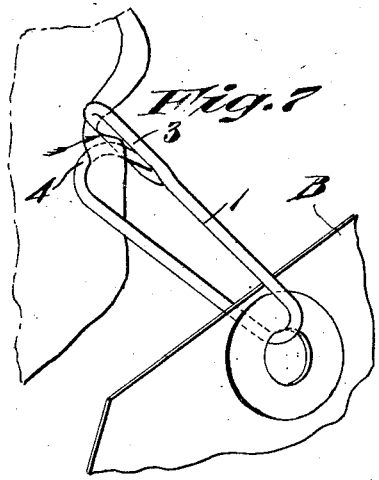
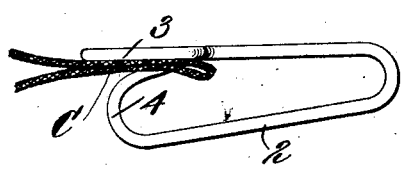
Inventor
Frank H. Thompson
by Roberts, Roberts & Cushman
his Attys.

Patented Nov. 16, 1926.

1,607,319

UNITED STATES PATENT OFFICE.

FRANK H. THOMPSON, OF FRAMINGHAM, MASSACHUSETTS, ASSIGNOR TO DENNISON MANUFACTURING COMPANY, OF FRAMINGHAM, MASSACHUSETTS, A CORPORATION OF MASSACHUSETTS.

TAG FASTENER.

Application filed July 25, 1924. Serial No. 728,121.

Wire fasteners heretofore in use for attaching tags and labels to goods of different descriptions usually have been formed with sharp unprotected points which are not only troublesome because they often catch in adjacent goods or articles but also persons handling the goods frequently jam their hands against the points thereby causing much annoyance and possible injury. The use of such fasteners on feed bags has also frequently caused injury to live stock as a result of the fasteners accidentally getting in the stock food.

Objects of the invention are to provide a fastener which has no projecting unprotected points, which is capable of being readily attached to and detached from fabric or other material, and which is strongly constructed and inexpensive to manufacture.

The invention comprises a fastener preferably formed from a single piece of spring wire bent into an oblong shape providing two resilient arms. The extremity of one arm may be bent upon itself to form a closed loop, the outer end of which provides a piercing portion adapted to be inserted into loosely woven fabrics. The extremity of the other arm is preferably bent inwardly toward the other arm and backwardly to provide a hook which is adapted to catch in the goods to which the fastener is attached. Owing to the resiliency of the arms the end of the hook normally extends into the recess between the two portions of the closed loop so that the point of the hook is protected, thereby eliminating the disadvantages of the unprotected sharp point.

The invention is shown by way of illustration on the accompanying drawings, in which:—

Fig. 1 is an edge view of a fastener;
Fig. 2 is a side elevation thereof;
Fig. 3 is a transverse section on the line 3—3 of Fig. 2;
Fig. 4 is a perspective view showing the fastener attached to a fabric;
Fig. 5 is a perspective view showing the manner of attaching the fastener to a loosely woven fabric;
Fig. 6 is a side view showing the manner of attaching the fastener to a closely woven fabric; and
Fig. 7 is a perspective view showing the manner of disengaging the fastener from the fabric.

As shown the fastener comprises a single piece of spring metal wire bent into an oblong shape to provide arms 1 and 2. A guard is formed on the arm 1 by bending the wire back on itself to provide a closed loop 3 and in order to avoid sharp edges the end of the wire is bevelled and lies in a recess formed by slightly bending the wire adjacent said end.

A hook 4 is formed on the arm 2 by bending the end of the wire inwardly toward the arm 1. As indicated in Fig. 3 the end of the hook is pointed and the sides thereof are oppositely bevelled to lie between the sides of the loop 3 thereby preventing the sharp point of the hook extending exteriorly of the fastener. The hook is normally held in close juxtaposition to the closed loop by the resilient arms but is adapted to be moved away from the loop for attachment. The closed loop 3 not only guards the point of the hook, but also serves to restrain the material engaged by the fastener from accidental detachment.

In order to attach the fastener to a loosely woven fabric A, such as a burlap bag, the outer end or piercing portion of the arm 1 is inserted between the strands (Fig. 5) until the hook rides over the fabric, whereupon the movement is reversed and the bight of fabric is transferred to hook 4 as shown in Fig. 4. The fastener is attached in a somewhat similar manner to a closely woven fabric, but as it is difficult to insert the piercing portion of the arm 1 into such fabric without tearing, the fastener is preferably forced over a folded portion of the fabric as shown in Fig. 6 until the hook rides over the fabric a sufficient distance and then by a reverse movement the point of the hook pierces in the fabric and the attachment is effected as shown in Fig. 4.

The fastener may be disengaged from the material by sliding the material along the hook toward its free end and at the same time deflecting the bight of material to one side of the guard as shown in Fig. 7.

An outstanding feature of the invention is the protected hook which enables the goods to which the fastener is applied to be handled without danger of injury. As described, only a single motion is required to attach the fastener to loosely woven goods and but two motions are required in the case of closely woven goods. Although the fastener has been shown attached to fabric goods, it will be understood that it may be attached to other materials as heavy paper, leather, wire fencing, straw matting, rugs, bolts of cloth, etc.

I claim:

1. A fastener having a hook adapted to be looped through material to which the fastener is to be attached, a guard having a recessed portion for the end of the hook and extending beyond it to form a piercing portion, the guard normally disposed outside the hook in the plane of the hook, the end of the hook being unattached to the guard and being movable therefrom for attachment, and yielding means for normally holding the hook and guard in juxtaposition, the guard being wider than the hook and shaped to obstruct movement of the end of the hook beyond the plane thereof and to protect the point of the hook.

2. A fastener having a hook adapted to be looped through material to which the fastener is to be attached, and a guard connected by a looped portion to and integral with said hook and approximately tangential to the end of the hook and extending beyond it to form a piercing portion, the guard normally disposed outside the hook in the plane of the hook, the end of the hook and the guard being recessed and normally interfitting transversely to restrain lateral movement of the hook relatively to the guard and to protect the point of the hook, but being separable for attachment to material by relative movement in a plane, and the guard obstructing relative movement of the end of the hook beyond the plane thereof.

3. A fastener comprising a pair of connected resilient arms, a hook on one arm arranged normally to lie in close juxtaposition to the inside of the other arm, and a guard on said other arm extending beyond the hook to form a piercing portion, said guard being wider than the end of said hook and recessed to engage and protect said end but permit separation of said arms for attachment, the space between the arms being unobstructed for the insertion of material when the arms are sprung apart, and the tip of the hook normally extending into the recess in said guard.

4. A fastener comprising a pair of connected resilient wire arms, a hook on one arm arranged normally to lie in close juxtaposition to the inside of the other arm, a folded portion on said other arm to receive the end of said hook thereby to prevent exposure thereof beyond said other arm but to permit separation of said arms for attachment, the arms being shaped for separation by straight movement in a direction parallel to the plane of the arms, and said folded portion being narrow to function as a piercer.

5. A fastener comprising a pair of resilient arms, a hook on one arm arranged normally to lie in close juxtaposition to the inside of the other arm, a folded end portion on the other arm extending beyond the end of said hook to provide a narrow piercing portion, the end of the hook being arranged to extend between the folds of said end portion to be protected thereby but permitting the arms to be separated for attachment.

6. A fastener comprising an open spring loop having one end turned inwardly to form a hook inside the other end and the latter end being folded sharply in a plane transverse of said hook to form a recess for the end of the hook, the space between the portions of the folded end being less than the width of the hook to prevent the end of the hook from passing therethrough, the resiliency of the loop normally pressing the end of the hook into said recess.

Signed by me at Framingham, Mass., this 14th day of July, 1924.

FRANK H. THOMPSON.